US010003160B2

(12) United States Patent
Wu et al.

(10) Patent No.: US 10,003,160 B2
(45) Date of Patent: Jun. 19, 2018

(54) INTERFACE MODULE AND RELATED METHOD

(71) Applicant: MEDIATEK INC., Hsin-Chu (TW)

(72) Inventors: Mao-Lin Wu, Hsinchu County (TW); Ho-Chung Chen, Taipei (TW); Chia-Yu Hsieh, Taoyuan (TW); Li-Chun Yang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days. days.

(21) Appl. No.: 15/403,192

(22) Filed: Jan. 11, 2017

(65) Prior Publication Data

US 2017/0133796 A1 May 11, 2017

Related U.S. Application Data

(63) Continuation of application No. 13/661,014, filed on Oct. 25, 2012, now abandoned.

(60) Provisional application No. 61/672,780, filed on Jul. 18, 2012.

(51) Int. Cl.
*G06F 1/16* (2006.01)
*H01R 13/6581* (2011.01)
*H01R 13/646* (2011.01)

(52) U.S. Cl.
CPC ....... *H01R 13/6581* (2013.01); *H01R 13/646* (2013.01)

(58) Field of Classification Search
CPC ........................ H01R 13/6581; H01R 13/6582
See application file for complete search history.

(56) References Cited

U.S. PATENT DOCUMENTS

| | | | | |
|---|---|---|---|---|
| 7,440,287 | B1 * | 10/2008 | Ni | H01R 27/00 174/50.51 |
| 7,833,056 | B1 | 11/2010 | Lee | |
| 8,052,461 | B2 | 11/2011 | Wang | |
| 8,408,942 | B1 | 4/2013 | Huang | |
| 2005/0164532 | A1 | 7/2005 | Ni | |
| 2006/0023433 | A1 * | 2/2006 | Lin | G06K 19/07732 361/752 |

(Continued)

FOREIGN PATENT DOCUMENTS

| | | |
|---|---|---|
| CN | 201528090 U | 7/2010 |
| EP | 2432080 | 3/2012 |
| TW | M385871 | 8/2010 |

OTHER PUBLICATIONS

USB 3.0 RFI Impact on 2.4GHz Wireless Devices, Pujitha Davuluri, pujitha.davuluri@intel.com, Mar. 13, 2012, USB-IF CabCon Confidential, Intel Corporation.

(Continued)

*Primary Examiner* — Hoa C Nguyen
*Assistant Examiner* — Christopher L Augustin
(74) *Attorney, Agent, or Firm* — Winston Hsu

(57) ABSTRACT

An interface module coupled between a host device and a wireless device is disclosed. The interface module includes a connector, having a first part covered in a first case with a first depth and a second part covered in a second case with a second depth; and a control circuit coupled to the first part of the connector, for controlling data transmission between the host device and the wireless device; wherein the second case is made of a conductive material and which can be further covered by an absorptive material.

9 Claims, 3 Drawing Sheets

(56) References Cited

U.S. PATENT DOCUMENTS

| | | | | |
|---|---|---|---|---|
| 2007/0076382 | A1 | 4/2007 | Ni | |
| 2007/0076387 | A1* | 4/2007 | Ni | H01R 13/502 361/760 |
| 2008/0280466 | A1 | 11/2008 | Sitz | |
| 2009/0021904 | A1 | 1/2009 | Yang | |
| 2010/0124010 | A1* | 5/2010 | Shiu | H05K 3/284 361/679.31 |
| 2010/0265649 | A1 | 10/2010 | Singh | |
| 2011/0143673 | A1 | 6/2011 | Landesman | |
| 2011/0281465 | A1* | 11/2011 | Hou | H01R 12/778 439/607.55 |
| 2011/0304510 | A1 | 12/2011 | Wang | |
| 2012/0009818 | A1 | 1/2012 | Yao | |
| 2012/0100755 | A1 | 4/2012 | Zhang | |
| 2014/0030800 | A1 | 1/2014 | Moses | |
| 2015/0072539 | A1* | 3/2015 | Xie | H01R 35/02 439/13 |

OTHER PUBLICATIONS

USB 3.0* Radio Frequency Interference Impact on 2.4 GHz Wireless Devices, White Paper, Apr. 2012, Intel Corporation.

* cited by examiner

INTERFACE MODULE AND RELATED METHOD

CROSS REFERENCE TO RELATED APPLICATION

This application is a continuation application of U.S. application Ser. No. 13/661,014, which was filed on Oct. 25, 2012, entitled “INTERFACE MODULE AND RELATED METHOD”, and claims the benefit of U.S. Provisional Application No. 61/672,780 filed on Jul. 18, 2012, the contents of which are incorporated herein in their entirety.

BACKGROUND

The present invention relates to an interface module and method thereof, and more particularly, to an interface module and method thereof capable of reducing noise, common-mode voltage, radiation of the interface module.

With the recent advances in wireless communication technology, Giga-bits wireless communication is visible and be required. Thus, an interface module between a wireless local area network (WLAN) card and a host device (e.g. a laptop, a personal computer) also needs to be capable of accomplishing high speed data transmission between the WLAN card and the host device. Thus, the interface module between the WLAN card and the host device may follow USB 3.0 standard, for achieving the high speed data transmission.

Please refer to FIG. 1A and FIG. 1B, which are schematic diagrams of a conventional interface module 10. The interface module 10 is realized under USB 3.0 standard, for transmitting data between a host device COM1 and a wireless device COM2. As shown in FIG. 1A and FIG. 1B, the interface module 10 comprises a connector 100 and a control circuit 102. The connector 100 is covered in a case 104 with a depth N and is utilized for plugging in the host device, to connect to the host device COM1. As is known, the case 104 is a metal plug shell, for shielding the metal contacts of the connector 100, and the metal plug shell is connected securely to ground at the host device when the connector plugs into the host device. The connector 100 is coupled to the control circuit 102 through a plurality of pin elements PIN. For controlling data transmission of the interface module 10, the control circuit 102 is not only coupled to the connector 100 but also configured in the same board of the wireless device COM2.

In order to be compatible with the USB 2.0, the USB 3.0 connector structure is fixed. However, the other five pin elements are added in the original connector space. Then, crowded, bent and non-impedance controlled pins let the interface module 10 emits noise, common-mode voltage, radiations when the interface module 10 transmits data with the high transmission speed of USB 3.0. The noise radiation generated while transmitting data covers the signal frequency band of the wireless device COM2, and thus, the performance of the wireless device COM2 would be decreased. In other words, if the interface module 10 transmits data in the transmission speed of USB 3.0, the sensitivity of the wireless device COM2 is degraded and the wireless device COM2 may work abnormally.

Besides, the well-known design rule of differential line, GSSG, can not be implemented in USB 3.0 pin sequence of the plurality of pin elements PIN. For example, the pin sequence of the plurality of pin elements PIN may only have a ground line between two pairs of signal lines. Thus, the impedances of the signal lines are imbalanced. Accordingly, the asymmetrical pin sequence not only degrades the common mode performance of the interface module 10, but also results in great noise radiation and crosstalk. Furthermore, the high speed transmission of USB 3.0 causes more return-current loops and results in a voltage difference between the connector 100 and ground of the host device COM1. The voltage difference between the connector 100 and the ground of the host device COM1 would also degrade the common mode performance of the interface module 10 and further result in greater noise radiation.

As can be seen from the above, the noise radiation generated when the interface module transmits data in the transmission speed of USB 3.0 would damage the performance of the wireless device and may result the wireless device works abnormally. Thus, how to reduce the noise radiation of the interface module realized in USB 3.0 for the wireless device becomes an important issue of the industry.

SUMMARY

Therefore, the present invention provides an interface module and related method capable of reducing noise radiation emitted from the interface module.

The present invention discloses an interface module coupled between a host device and a wireless device. The interface module includes a connector, having a first part covered in a first case with a first depth and a second part covered in a second case with a second depth; and a control circuit coupled to the first part of the connector, for controlling data transmission between the host device and the wireless device; wherein the second case is made of a conductive material.

The present invention further discloses a method of reducing noise for an interface module coupled between a host device and a wireless device, wherein the interface module comprises a connector, having a first part covered in a first case with a first depth, and a control circuit coupled to the first part of the connector through a plurality of pin elements. The method includes covering a second part of the connector by a conductive material; and covering the plurality of pin element and the control circuit by an absorptive material.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
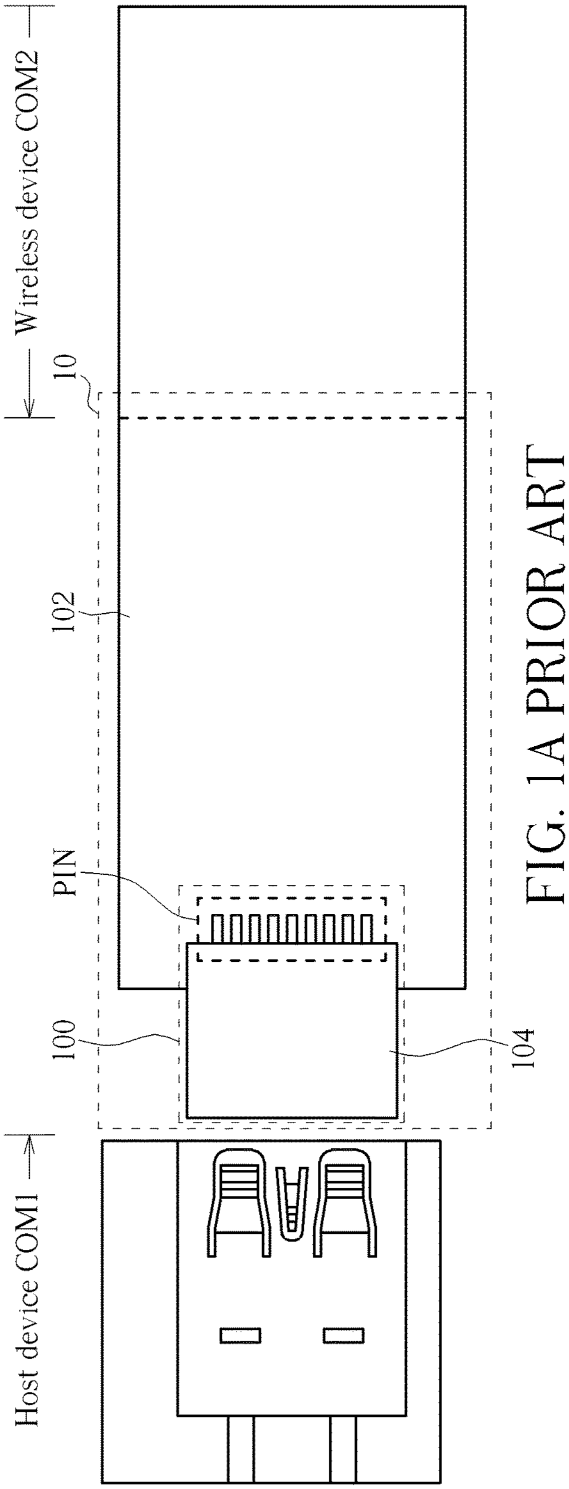
FIG. 1A PRIOR ART
FIG. 1A and FIG. 1B are schematic diagrams of a conventional interface module.
Figure 1B:
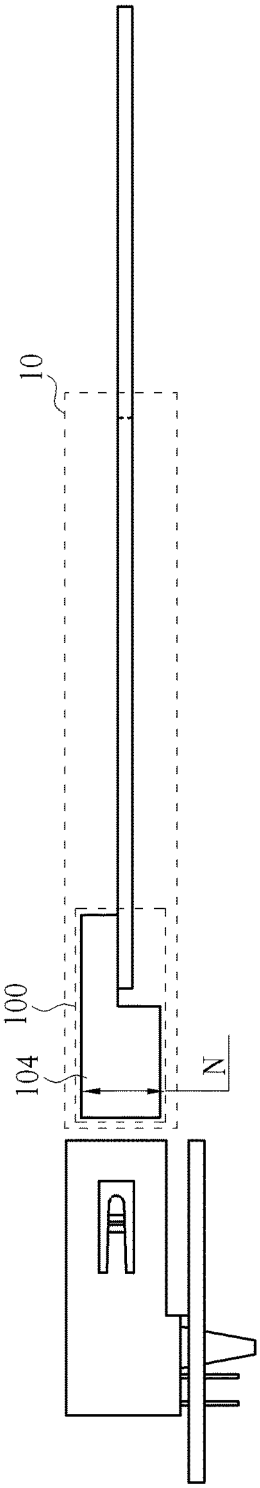
FIG. 1B PRIOR ART
Figure 2A:
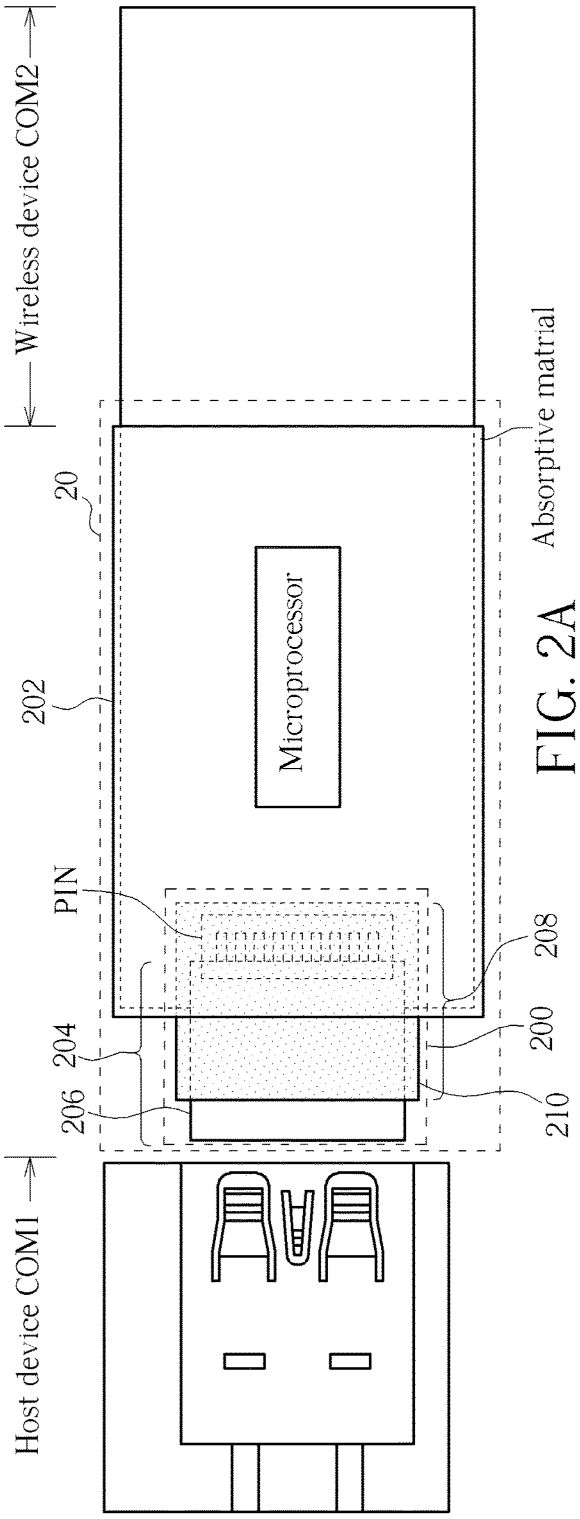
FIG. 2A and FIG. 2B are schematic diagrams of an interface module according to an embodiment of the present invention.
Figure 2B:
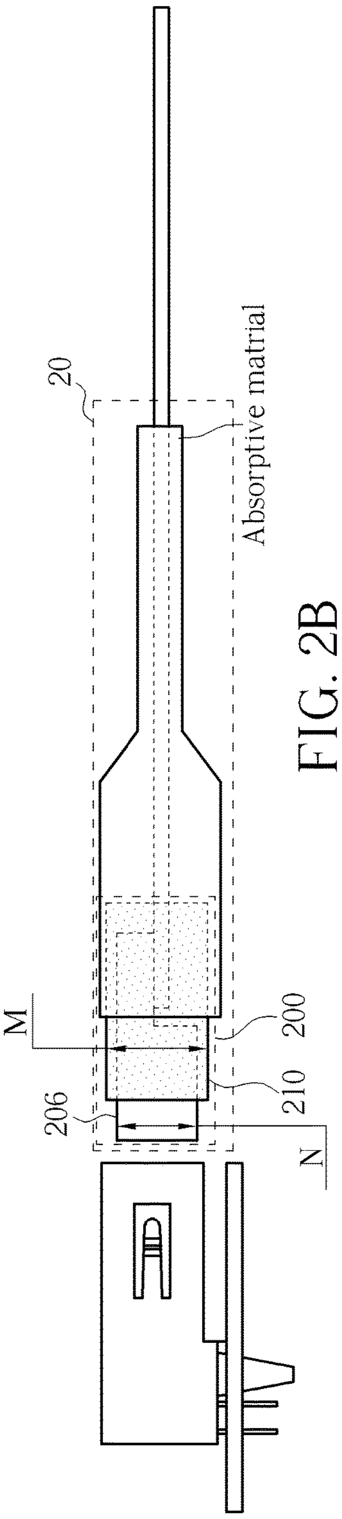

Please refer to FIG. 2A and FIG. 2B, which are schematic diagrams of an interface module 20 according to an embodiment of the present invention. The interface module 20 is utilized for transmitting data between a host device COM1 and a wireless device COM2. The wireless device COM2 may support IEEE 802.11a/b/g/n/ac standard, Bluetooth standard, WiGig 60 GHz, or long term evolution (LTE) standard, but is not limited herein. As shown in FIG. 2A and FIG. 2B, the interface module 20 comprises a connector 200 and a control circuit 202. The connector 200 includes a first part 204 covered in a case 206 with a depth N and a second part 208 covered in a case 210 with a depth M. The connector 200 is utilized for plugging in the host device COM1, to connect to the host device COM1. The control circuit 202 is coupled to the first part of the connector 200 through a plurality of pin elements PIN and is configured on the same board of the wireless device COM2. The control circuit 202 is utilized for controlling data transmission of the interface module 20. Different from the interface module 10 shown in FIG. 1, the second part 208 of the connector 200 is further covered in the case 210 with the depth M. The case 210 is made of a conductive material. After adding the case 210, the depth of the second part 208 equals the depth N pluses the depth M. Preferably, the case 210 covers the plurality of pin elements PIN (i.e. the connection between the connector 200 and the control circuit 202), but is not limited herein. Moreover, the plurality of pin elements PIN and the control circuit 202 is covered by an absorptive material. For example, the absorptive material is an absorber or an isolator. After adding the metal case 210 and the absorptive material which covers the control circuit 202 and the plurality of pin elements PIN, the noise radiation generated by the interface module 20 transmitting data with the transmission speed of USB 3.0 can be reduced. As a result, the performance of the wireless device COM2 would not be damaged and the throughput of the wireless device COM2 can be increased.

In detail, since the depth of the second part 208 is greater than the depth N of the case 206 after adding the case 210, the case 210 would contact to the ground of the host device COM1 when the connector 200 plugs in the host device COM1. The contacting area between the ground of the host device COM1 and the ground of the connector 200 increases, such that the voltage difference between the ground of the host device COM1 and the connector 200 is reduced. In such a condition, the noise radiation in low frequency range can be reduced after covering the case 210 for improving the ground connection between the host device and the connector. Please note that, the second part 208 includes the plurality of pin elements PIN in this embodiment, but is not limited herein.

On the other hand, the plurality of pin elements PIN and the control circuit 202 are covered by the absorptive material, such as an absorber or an isolator, for further reducing the noise radiation generated while transmitting data. Due to the high transmission speed of USB 3.0, the noise radiation generated while transmitting data is in high frequency range. Thus, using the conductive material to reduce the noise radiation through Shielding Effectiveness is not effective. In this embodiment, the plurality of pin elements PIN and the control circuit 202 are covered by the absorptive material, for effectively reducing the noise radiation in high frequency range. After covering the plurality of pin elements PIN and the control circuit 202 by the absorptive material, the noise radiation can be further reduced. As a result, the noise radiation generated while transmitting data with the transmission speed of USB 3.0 can be reduced through covering the second part 208 in the case 210 and covering the plurality of pin elements PIN and the control circuit 202 by the absorptive material. The performance of the wireless device COM2 would not be damaged and the wireless device can achieve higher bandwidth.

Please note that, the embodiment of the present invention covers part of the connector of the interface module with another case, so as to improve ground connection between the host device and the interface module. Besides, the plurality of pin elements and the control circuit are covered by the absorptive material for absorbing noise radiation while transmitting data. As a result, the noise radiation generated when the interface module operates in the high transmission speed of USB 3.0 can be effectively reduced. According to different applications, those skilled in the art may accordingly observe appropriate alternations and modifications. For example, the absorptive material covering the plurality of pin elements and the control circuit can be replaced by materials which can attenuate noise radiation.

Figure 3:
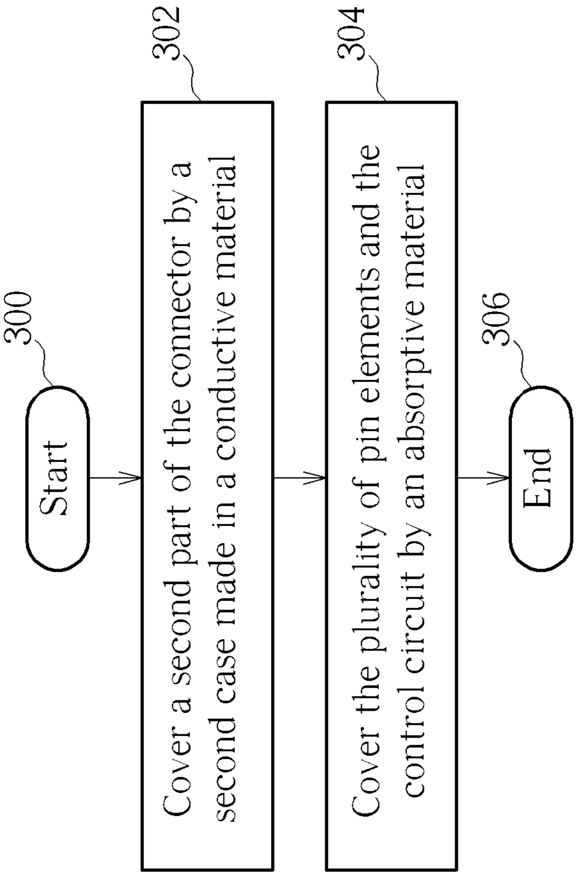
FIG. 3 is a schematic diagram of a method for reducing noise radiation of an interface module according to embodiment of the present invention.

The method of constructing the above-mentioned interface module for reducing noise radiation can be summarized into a method 30, as shown in FIG. 3. The method 30 can reduce noise radiation of an USB 3.0 interface module having a connector and a control circuit. The connector includes a first part covered in a first case with a first depth. The control circuit is coupled to the first part of the connector through a plurality of PIN elements. The method 30 includes, but not limited to, following step:

Step 300: Start.

Step 302: Cover a second part of the connector by a second case made in a conductive material.

Step 304: Cover the plurality of pin elements and the control circuit by an absorptive material.

Step 306: End.

According to the method 30, the noise radiation of the USB 3.0 interface module can be effectively reduced. The detail of the method 30 can be referred to the above, and is not narrated herein for brevity. Please note that, the noise radiation of the interface module would be reduced by executing either step 302 or step 304. In other words, the step 302 and the step 304 can be separately executed for reducing the noise radiation of the interface module.

To sum up, the above mentioned interface module and related method using the conductive material as a case for covering the second part of the connector in the interface module, to reduce low frequency noise of the interface module. On the other hand, the high frequency noise of the interface module is reduced by covering the plurality of pin elements and the control circuit of the interface module in the absorptive material. As a result, the interface module and related method in the present invention are capable of reducing noise radiation generated when the interface module operates in transmission speed of USB 3.0. The performance of the wireless device would not be damaged and the throughput of the wireless device would increase.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interface module coupled between a host device and a wireless device, comprising:

a connector, having a first part covered in a first case with a first depth and a second part covered in a second case with a second depth; and a control circuit coupled to the first part of the connector via a plurality of pin elements, for controlling data transmission between the host device and the wireless device;

wherein the first case is a metal plug shell of the connector and connected to the ground of the host device when the connector plugs in the host device, wherein the second case is made of a conductive material and contacts to the ground of the host device when the connector plugs in the host device, and with the second case, the contacting area between the ground of the host device and the ground of the connector increases;

wherein the first part overlaps the second part.

2. The interface module of claim 1, wherein the second part comprises the plurality of pin elements.

3. The interface module of claim 2, wherein the plurality of pin elements of the connector and the control circuit are covered by an absorptive material, to reduce high frequency noise of the interface module.

4. The interface module of claim 3, wherein the absorptive material is an absorber.

5. The interface module of claim 3, wherein the absorptive material is an isolator.

6. The interface module of claim 1, wherein the wireless device supports 802. 11a/b/g/n/ac communication standard, WiGig 60 GHz communication standard, Bluetooth communication standard or long term evolution (LTE) communication standard.

7. The interface module of claim 1, wherein the control circuit includes a processor.

8. A noise reducing method of reducing noise for an interface module coupled between a host device and a wireless device, wherein the interface module comprises a connector, having a first part covered in a first case with a first depth, and a control circuit coupled to the first part of the connector through a plurality of pin elements, the first case being a metal plug shell of the connector and connected to the ground of the host device when the connector plugs in the host device, the method comprising:

covering a second part of the connector by a conductive material, wherein the conductive material contacts to the ground of the host device when the connector plugs in the host device, and with the conductive material the contacting area between the ground of the host device and the ground of the connector increases.

9. The noise reducing method of claim 8, further comprising:

covering the plurality of pin elements and the control circuit by an absorptive material, to reduce high frequency noise of the interface module.

* * * * *